United States Patent [19]

Ackerman et al.

[11] Patent Number: 6,107,242
[45] Date of Patent: Aug. 22, 2000

[54] ABSORBENT MATERIAL INCLUDING COIR FIBRES AND/OR COIR DUST

[75] Inventors: Louis Ackerman, Yarraville; George Lopez, Alexandra, both of Australia

[73] Assignee: Coir Peat Aust Pty Ltd, Australia

[21] Appl. No.: 09/242,771

[22] PCT Filed: Aug. 21, 1997

[86] PCT No.: PCT/AU97/00535

§ 371 Date: May 24, 1999

§ 102(e) Date: May 24, 1999

[87] PCT Pub. No.: WO98/07804

PCT Pub. Date: Feb. 26, 1998

[30] Foreign Application Priority Data

Aug. 22, 1996 [AU] Australia ................... PO1829

[51] Int. Cl.⁷ ............. B01J 20/00; B01J 20/22; C09K 21/00
[52] U.S. Cl. ............. 502/404; 502/401; 252/601; 252/607
[58] Field of Search ................... 502/401, 404; 252/601, 607

[56] References Cited

U.S. PATENT DOCUMENTS

| 3,703,464 | 11/1972 | Ferm . | |
| 3,877,952 | 4/1975 | Dahmen et al. | 106/15 |
| 4,172,039 | 10/1979 | Akiyama | 210/502 |
| 4,184,311 | 1/1980 | Rood | 53/434 |
| 4,600,606 | 7/1986 | Mischutin | 427/389 |
| 4,739,603 | 4/1988 | Butler | 52/750 |
| 5,409,769 | 4/1995 | Fukumoto et al. | 428/304.4 |

FOREIGN PATENT DOCUMENTS 2536807 12/1976 Germany .

OTHER PUBLICATIONS

Derwent Accession Number 95–190277/25, Japanese Patent No. 07108170–A issued Apr. 25, 1995.

Patent Abstracts of Japan, C73 p. 165, Japanese Appln. No. 53–67914 filed May 6, 1978.

Japanese Abstract 07109652, Suzuki Sogyo KK, Apr. 25, 1995.

*Primary Examiner*—Steven P. Griffin
*Assistant Examiner*—Cynthia Donley
*Attorney, Agent, or Firm*—Samuels, Gauthier & Stevens

[57] ABSTRACT

A fire retardant absorbent material including coir fibres and/or coir dust, an effective quantity of a fire retardant material in the form of small particles, the particle size of the fire retardant material being of the order of less than 1 micron to ensure that the fire retardant material substantially penetrates or substantially coats at least a substantial proportion of the coir fibres present in the absorbent material.

16 Claims, No Drawings

ABSORBENT MATERIAL INCLUDING COIR FIBRES AND/OR COIR DUST

FIELD OF THE INVENTION

This invention relates to absorbent materials.

BACKGROUND OF THE INVENTION

The use of coir dust as an absorber of spills of various types has been known for some time, although not widely used. In U.S Pat. No. 3,703,464, the use of coir dust or coconut short fibers is described as a satisfactory absorbent material for oil spills on water and on other surfaces. The widespread use of this material as a spill absorbent has been restricted to situations where exposure to high levels of heat or fire are not present since coir dust is capable of burning and is therefore regarded as a potential fire hazard.

SUMMARY OF INVENTION AND OBJECT

It is the object of the present invention to provide an improved absorbent material which can be used in situations involving high levels of heat or fire.

The invention therefore provides an absorbent material including coir fibers and/or coir dust, an effective quantity of a fire retardant material in the form of small particles, the particle size of the fire retardant material being selected to ensure that the fire retardant material substantially penetrates or substantially coats at least a substantial proportion of the coir fibers present in the absorbent material.

Preferably, the fire retardant is in the form of a powder, the particle size of which is smaller than the particle size of the coir fibers and/or coir dust to encore that the fire retardant material substantially penetrates the coir fibers present in the absorbent material.

The fire retardant may include a suitable phosphate material, such as ammonium polyphosphate. In its most preferred form, the fire retardant material comprises superphosphate. The inventors have found that superphosphate functions adequately as a fire retardant and that the above defined combination of coir fibers and/or coir dust and superphosphate in the form of a powdered results in an absorbent material which is essentially self-extinguishing in the presence of high levels of heat or fire.

It has been found that superphosphate in fine powder form, similar to talcum powder, and preferably having a particle size less than 10 microns, and preferably less than 5 microns and most preferably of the order of one micron performs satisfactorily in that it adequately penetrates the coconut fibers present in the absorbent material to provide a self-extinguishing property in these fibers.

In a preferred form, the absorbent material includes from about 4 to at least about 8 grams of powdered superphosphate to 115 grams or 1 liter of dry coir dust, together with sufficient water or other suitable liquid to ensure intimate mixing.

In another aspect, the invention provides a method of producing an absorbent material including intimately mixing coir fibers and/or coir dust with an effective quantity of a fire retardant material in the form of small particles, and adding an effective quantity of a liquid such as water to promote intimate mixing of the coir fibers and the fire retardant material whereby the fire retardant penetrates or coats the coir fibers, the particle size of the fire retardant material being selected to ensure that the fire retardant penetrates or coats the coir fibers in the absorbent material.

Preferably, the fire retardant is in the form of a powder, the particle size of which is smaller than the particle size of the coir fibers and/or coir dust to ensure that the fire retardant material substantially penetrates the coir fibers present in the absorbent material.

In a preferred form of the method, powdered superphosphate is used as the fire retardant. It has been found that satisfactory results are achieved by the following mixtures: from about 4 grams to at least about 8 grams of powdered superphosphate to 115 grams or 1 liter of dry coir dust and approximately 65 mL water intimately mixed together to ensure penetration of the powdered superphosphate into the coir fibers.

An inspection of the absorbent material according to the above combination shows evidence of small crystals of superphosphate embedded in the walls of the coir fiber nodules. These crystals are believed to contain water of crystallisation which is released when the absorbent material is heated thereby producing the desired self-extinguishing properties.

DESCRIPTION OF PREFERRED EMBODIMENT

Coir dust in the form of compressed bricks 200 mm×100 mm×50 mm are reconstituted as coir dust and then intimately mixed with superphosphate and water in the ratio about 115 grams or 1 liter of dry coir dust to about 8 grams superphosphate to about 65 mL of water. To ensure proper reconstitution of the bricks and intimate mixing of the resultant coir dust, the coir dust bricks are placed in a rotating hammer mill and a fine mist of water is sprayed onto the bricks as they are converted to the constituent coir dust by the hammer mill. At the same time, superphosphate in the form of a fine powder having a particle size of the order of 1 micron is added to the mill.

A typical analysis of the absorbent product described above is as follows:

| | |
|---|---|
| Nitrogen (N) as Protein | 0.52% |
| Phosphorus (P) as Phosphate | 0.57% |
| Potassium (K) | 0.19% |
| Calcium (Ca) | 1.2% |
| Sulphur (S) as Sulphate | 0.72% |
| pH of water extract | 5.6 |

As mentioned above, a microscopic inspection of the coir fiber nodules contained in the coir dust shows evidence of small crystals of superphosphate embedded in the walls of the nodules. These crystals are believed to contain water of crystallization which is released when the absorbent material is heated thereby aiding in fire retardation.

Acceptable results are achieved using as little as about 4 grams of powdered superphosphate to 115 grams or 1 liter of dry coir dust and about 65 mL of water. Better results are achieved using 6 grams of powdered superphosphate and best results are achieved using 8 grams of superphosphate. The use of more than 8 grams of superphosphate does not seem to improve performance to any material extent.

The absorbent material is relatively inert and of low toxicity and is biodegradable. Where the product is used to absorb oil spills, the absorbed oil may burn if exposed to sufficient heat or flame, but this burning can be controlled by spreading further absorbent product over the fire.

What is claimed is:

1. An absorbent material including coir fibers and/or coir dust, a phosphate containing fire retardant material in the form of small particles, the particle size of the fire retardant material being smaller than the particle size of the coir fibers and/or dust to ensure that the fire retardant material penetrates or coats at least a portion of the coir fibers present in the absorbent material.

2. The absorbent material of claim 1, wherein the powder has a particle size of the order of less than 10 microns.

3. The absorbent material of claim 2, wherein the powder has a particle size of the order of less than 5 microns.

4. The absorbent material of claim 3, wherein the powder has a particle size of the order of less than 1 micron to enable penetration of the coir fibers in the absorbent material.

5. The absorbent material of claim 1 wherein the phosphate material is an ammonium polyphosphate.

6. The absorbent material of claim 5, wherein the phosphate material is superphosphate.

7. The absorbent material of claim 6, including from about 4 to at least about 8 grams of powdered superphosphate to about 115 grams or 1 liter of dry coir dust, together with about 65 ml of water to ensure intimate mixing.

8. A method of producing an absorbent material including intimately mixing coir fibers and/or coir dust with fire retardant quantity of a phosphate containing fire retardant material in the form of small particles having a particle size smaller than the particle size of the coir fibers and/or coir dust, and adding water to promote intimate mixing of the coir fibers and the fire retardant material whereby the fire retardant penetrates or coats the coir fibers.

9. The method of claim 8, wherein the powder has a particle size of the order of less than 10 microns.

10. The method of claim 9, wherein the powder has a particle size of the order of less than 5 microns.

11. The method of claim 10, wherein the powder has a particle size of the order of less than 1 micron.

12. The method of claim 8, wherein the phosphate material is an ammonium polyphosphate.

13. The method of claim 12, wherein the phosphate material is superphosphate.

14. The method of claim 13, including from about 4 to at least about 8 grams of powdered superphosphate to 115 grams or 1 liter of dry coir dust, together with about 65 ml of water to ensure intimate mixing.

15. The absorbent material of claim 4, wherein the phosphate material is an ammonium polyphosphate.

16. The method of claim 11, wherein the phosphate material is an ammonium polyphosphate.

* * * * *